United States Patent Office 3,255,121
Patented June 7, 1966

3,255,121
PROCESS OF INHIBITING CORROSION OF FERROUS METALS
Olen L. Riggs, Jr., Ponca City, Okla., assignor to Continental Oil Company, Ponca City, Okla., a corporation of Oklahoma
No Drawing. Filed Aug. 2, 1963, Ser. No. 299,461
6 Claims. (Cl. 252—391)

This invention relates to a corrosion inhibitor and to a process of inhibiting carbon dioxide and/or hydrogen sulfide corrosion of ferrous metal.

Carbon dioxide and hydrogen sulfide, in the presence of water, are corrosive to ferrous metals. The problem is acute in oil fields because water (brine) is produced simultaneously to a greater or lesser degree with all crude oil. $CO_2$ and/or $H_2S$ is invariably present in these environments. All the ferrous metal used in production of crude, such as, oil well casing, tubing, sucker rods and pumps, are subject to severe corrosive conditions. Even after the crude is dewatered, enough brine remains in the oil to cause corrosive troubles in storage tanks and crude pipelines.

Water and $H_2S$ are omnipresent in refinery products and cause corrosion of refinery equipment, tanks and product pipelines.

Oil soluble chemicals have been developed which to some degree alleviate this $CO_2/H_2S$ corrosion problem. Better inhibitors are being searched for constantly. It is an object of this invention to provide a corrosion inhibitor for ferrous metal which is in the presence of $CO_2/H_2S$ and water. Another object is a process for protecting ferrous metal which is in contact with a corrosive $CO_2/H_2S$-water environment from the corrosive effects thereof. Other objects will become apparent in the course of the description of the invention.

It has been discovered the following class of compounds is an effective corrosion inhibitor for ferrous metals in an environment including water and carbon dioxide and/or hydrogen sulfide. A substituted guanidinium compound where the substituent is $RSO_3$— or $R'OSO_3$— and R is a radical derived from an aromatic hydrocarbon, aliphatic hydrocarbon or cycloaliphatic hydrocarbon and R' is a radical derived from an aliphatic hydrocarbon or cycloaliphatic hydrocarbon.

It has been discovered that the corrosive effect of corrosive fluid containing dissolved carbon dioxide and/or hydrogen sulfide can be moderated by adding to the fluid an inhibiting amount of the above described inhibitor.

In one aspect of the invention, the inhibitor is a guanidinium compound:

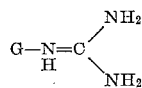

where G is either a sulfo group, $RSO_3$—, or a sulfate group, $R'OSO_3$—; R is a radical derived from an aromatic hydrocarbon, or aliphatic hydrocarbon having at least 8 carbon atoms, or cycloaliphatic hydrocarbon having at least 8 carbon atoms; and R' is a radical derived from an aliphatic hydrocarbon having at lest 8 carbon atoms or a cycloaliphatic hydrocarbon having at least 8 carbon atoms.

The aromatic hydrocarbon may be benzene; a substituted benzene such as ethylbenzene, xylene, isodurene, dodecylbenzene or waxbenzene where the substituent is obtained from paraffin wax and one, two or more substituents are present—typically diwaxbenzene where each wax group has about 20 carbon atoms; or a bridged or fused ring benzoid hydrocarbon such as diphenyl, naphthalene and anthracene and their substituted derivatives; or a hydroaromatic hydrocarbon. The alkyl benzenes having at least 6 alkyl carbon atoms are desirable; preferably these have 10–50 alkyl carbon atoms; especially preferred are those having 8–24 alkyl carbon atoms.

The aliphatic hydrocarbon may be saturated or unsaturated. It is desirable that the corrosion inhibitor has appreciable solubility in hydrocarbon oil and it is preferred that the aliphatic hydrocarbon have at least 8 carbon atoms. Preferred are the straight chain aliphatic hydrocarbons having 8–36 carbon atoms and especially about 12-24 carbon atoms.

The cycloaliphatic hydrocarbons may be saturated or unsaturated and may be single rings or fused rings. It is desirable that at least 8 carbon atoms be present, i.e., the total of ring carbon atoms and substituent carbon atoms. The alkylcyclohexanes having at least 6 alkyl carbon atoms are preferred, e.g., n-hexylcyclohexane; especially preferred are those alkylcyclohexanes having 6–18 carbon atoms.

An especially suitable hydrocarbon nucleus is afforded by the reaction product of a highly branched olefin with an aromatic hydrocarbon, in general, and a benzene hydrocarbon in particular; the products being alkylaromatic or alkylbenzenes respectively. These highly branched olefins are available from the petroleum industry through polymerization of propylene and/or butylene. In the case of the low molecular weight butylene polymers, the polymer normally contains 2 to 6 units. In the case of the low molecular weight propylene polymers, the polymer normally contains 2 to 8 units.

The especially preferred alkylaromatic hydrocarbons are normally prepared by reacting the olefin with the aromatic hydrocarbon in the presence of a Friedel-Crafts type catalyst, usually aluminum chloride.

This especially preferred hydrocarbon nucleus is obtained from the reaction product of propylene tetramer with benzene using aluminum chloride catalyst. The reaction product contains a wide range of alkylbenzenes both in number of alkyl groups present and in the number of carbon atoms present in each alkyl group. A particular fraction of the reaction product is the most preferred hydrocarbon nucleus for the subsequent sulfonation reaction. This preferred alkylbenzene nucleus is given the name "postdodecylbenzene" and includes as the alkylbenzene components monododecylbenzene and didodecylbenzene in the approximate molar ratio of 2:3. Typical characteristics of postdodecylbenzene are:

| | |
|---|---:|
| Specific gravity at 38° C. | 0.8649 |
| Average molecular weight | 385 |
| Percent sulfonatable | 88 |
| A.S.T.M. (D-158 Engler), ° F.— | |
|    I.B.P. | 647 |
|    5% | 682 |
|    50% | 715 |
|    90% | 760 |
|    95% | 775 |
|    F.B.P. | 779 |
| Refractive index at 23° C. (73° F.) | 1.4900 |
| Viscosity at— | |
|    −10° C. (14° F.) centipoises | 2800 |
|    20° C. (68° F.) do | 280 |
|    40° C. (104° F.) do | 78 |
|    80° C. (176° F. do | 18 |
| Aniline point, ° C. (156° F.) | 69 |
| Pour point, ° C. (−25° F.) | −31.7 |

Illustrative compounds of the invention are guanidinium octylbenzene sulfonate; guanidinium dodecylbenzene sulfonate, guanidinium di(dodecyl)benzene sulfonate; guanidinium diwaxbenzene sulfonate having a total of 40 alkyl carbon atoms; guanidinium n-dodecyl sulfate; guanidinium n-octadecylsulfate.

The corrosion inhibiting compounds of the invention may be utilized in any fluid which contains carbon dioxide and/or hydrogen sulfide in amounts sufficient to make the fluid corrosive to ferrous metal. The invention is especially beneficial in oil well use where brine is a major part of the total fluid produced by the well. However, the fluid may be a petroleum product containing occluded water and hydrogen sulfide formed by decomposition of sulfur compounds present in the product.

The inhibitor is added to the fluid in a corrosion inhibiting amount. This will vary with the type of corrosive fluid and the particular compound added. In general for oil well protection the inhibitor is added in an amount of about 10–500 parts per million, by weight, and commonly 20–150 p.p.m., based on total fluid, i.e., oil plus brine. The oil is separated from the brine before shipment to the refinery; the separated oil contains dissolved inhibitor sufficient to protect ferrous metal equipment contacted by the oil on the journey to the refinery either by pipeline or pipeline and tanker.

The inhibitor may be added to the fluid by any conventional procedure: To a flowing stream, the inhibitor may be introduced by way of a proportioning pump. To a tank, by adding the inhibitor and circulating the contents of the tank to blend the fluid and the inhibitor. The inhibitor may be added to an oil-well in any manner which will get it into solution; preferably the inhibitor is injected at the depth of the producing zone so that the tubing is protected all the way up the well.

Illustrations

I. Postdodecylbenzene sulfonic acid was prepared by reacting the postdodecylbenzene, described earlier, with oleum. The hydrocarbon was cooled to 10° C., 20% oleum was added very slowly over a period of 30 minutes with slow stirring to prevent splashing. The mole ratio of oleum to hydrocarbons was 8:1. The temperature was kept below 30° C. during the reaction. After all the acid had been added, the temperature was raised to 37° C. and the contents were stirred for one hour. Contents were cooled to 25° C., stirring was stopped, and a small amount of ice was added. The temperature was raised to approximately 70° C., then cooled to 65° C., and stirred vigorously for five minutes. The contents of the flask were poured into a separatory funnel, and the mixture was allowed to separate. The bottom portion was drawn off and discarded. The sulfonic acids made by this procedure are about 65 percent active sulfonic acid and 35 percent unreacted hydrocarbon. The hydrocarbon content was reduced to some extent by stripping the product to decrease the amount of lower boiling hydrocarbon present.

Guanidinium postdodecylbenzene sulfonate was prepared by introducing 1 mole of the sulfonic acid and 1 mole of guanidine carbonate in a standard 3-neck round flask provided with a mechanical stirrer and a reflux condenser. The flask was held at 180° C. for 2 hours at which time only a single homogeneous liquid was present in the flask. Because the carbon dioxide product passed out of the flask, no purification procedure was needed to be carried out on the product in the flask.

Corrosion test

The corrosion tests were carried out on a 1020 mild carbon steel coupon, 1 inch by 3 inches. The fluid was a mixture of kerosene and 5% NaCl brine. 150 ml. of brine and 50 ml. of kerosene were added to a 250 ml. large mouth bottle provided with a two hole rubber stopper. A glass tube permitted gas to be introduced into the flask, near the bottom thereof. A vent tube was connected to a hood. The corrosion inhibitor was dissolved into the kerosene before this was placed in the bottle. The bottle was agitated to distribute the inhibitor between the two liquids and the test coupon inserted. The bottle was placed in a bath held at 120° F. (49° C.) and the corrosive gas bubbled through the fluid at about 12 ml./second. The test was continued for a specified time when the coupon was removed, descaled, and its weight loss determined.

Simultaneously a control test was carried out using the above procedure, except that no inhibitor was present.

II. In this test, the amount of carbon dioxide corrosion of the steel coupon was measured in the absence of and the presence of the guanidinium postdodecylbenzene sulfonate, 100 p.p.m.

| Exposure Time, Hours | Corrosion Rate, Mils/Yr. | |
|---|---|---|
| | No Inhibitor | 100 p.p.m. Inhibitor |
| 1 | 90.0 | 5.0 |
| 30 | 27.0 | 0.7 |
| 64 | 14.0 | 0.2 |

III. In this test, the amount of hydrogen sulfide corrosion of the steel coupon was measured, in the absence of and in the presence of guanidinium postdodecylbenzene sulfonate, 11 p.p.m.

| Exposure Time, Hours | Corrosion Rate, Mils/Yr. | |
|---|---|---|
| | No Inhibitor | 100 p.p.m. Inhibitor |
| 1 | 51.0 | 3.2 |
| 22 | 23.2 | 0.3 |
| 66 | 28.7 | 0.2 |

The above test II shows that the corrosion rate decreased as scale built up even in the absence of inhibitor but, it is known the rate will continue at an unacceptable level. The inhibited oil began small and quickly attained a very satisfactory low level of corrosion rate.

The above test III shows the very real effectiveness of the inhibitor against sulfide corrosion where scale formation does not retard significantly the corrosion rate.

Thus having described the invention what is claimed is:

1. A process of inhibiting corrosion of ferrous metal which is in contact with corrosive fluid containing a dissolved constituent selected from the group consisting of $CO_2$, $H_2S$ and mixtures thereof, which process comprises adding to said fluid a corrosion inhibiting amount of a guanidinium compound:

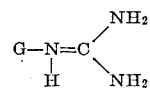

where G is a group selected from the class consisting of (A) $RSO_3-$ where R is a radical derived from a hydrocarbon selected from the class consisting (i) alkylbenzene hydrocarbons having 6–50 alkyl carbon atoms, (ii) aliphatic hydrocarbons having 8–36 carbon atoms, and (iii) cycloaliphatic hydrocarbons having 8–24 carbon atoms and (B) $R'OSO_3-$ where $R'$ is a radical derived from a hydrocarbon selected from the class consisting of (1) aliphatic hydrocarbons having 8–36 carbon atoms and (2) cycloaliphatic hydrocarbons having 8–24 carbon atoms.

2. The process of claim 1 wherein said corrosive fluid is a crude oil-brine mixture.

3. A process of inhibiting corrosion of ferrous metal which is in contact with corrosive fluid containing a dissolved constituent selected from the group consisting of $CO_2$, $H_2S$ and mixtures thereof, which process comprises adding to said fluid a corrosion inhibiting amount of a guanidinium compound:

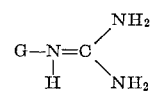

where G is a group selected from the class consisting of RSO$_3$— and R'OSO$_3$— where R is a radical derived from a hydrocarbon selected from the class consisting of alkylbenzenes having about 8–24 alkyl carbon atoms; straight chain aliphatic hydrocarbons having about 12–24 carbon atoms; and alkylcyclohexanes having 6–18 alkyl carbon atoms; and R' is a radical derived from a hydrocarbon selected from the class consisting of straight chain aliphatic hydrocarbons having about 12–24 carbon atoms and alkylcyclohexanes having 6–18 alkyl carbon atoms.

4. The process of claim 3 where said inhibitor is added in an amount of 10–500 parts per million by weight of said fluid.

5. A process of inhibiting corrosion of ferrous metal which is in contact with corrosive fluid containing a dissolved constituent selected from the group consisting of $CO_2$, $H_2S$ and mixtures thereof, which process comprises adding 10–500 parts per million by weight of guanidinium di(dodecyl)-benzene sulfonate corrosion inhibitor to said fluid.

6. A process of inhibiting corrosion of ferrous metal which is in contact with corrosive fluid containing a dissolved constituent selected from the group consisting of $CO_2$, $H_2S$ and mixtures thereof, which process comprises adding to said fluid 10–500 parts per million by weight of guanidinium n-octadecyl sulfate corrosion inhibitor.

References Cited by the Examiner
UNITED STATES PATENTS

| | | | |
|---|---|---|---|
| 1,719,650 | 7/1929 | Chamberlain | 252—390 |
| 2,276,587 | 3/1942 | Mettler | 260—457 |
| 2,319,668 | 5/1943 | Edmunds | 252—390 |
| 2,891,909 | 6/1959 | Hughes | 252—8.55 |
| 2,906,595 | 9/1959 | Pelcak et al. | 21—2.7 |
| 3,008,898 | 11/1961 | Hughes | 252—8.55 |
| 3,159,663 | 12/1964 | Klass et al. | 260—457 |
| 3,172,854 | 3/1965 | Scanley et al. | 252—8.55 |

JULIUS GREENWALD, *Primary Examiner.*

H. B. GUYNN, *Assistant Examiner.*